United States Patent
Miyake et al.

[11] Patent Number: 6,114,473
[45] Date of Patent: *Sep. 5, 2000

[54] RESIN COMPOSITION FOR POWDER COATING

[75] Inventors: Satoru Miyake; Hisao Ikeda; Motohiko Hidaka, all of Funabashi; Takeo Moro, Tokyo, all of Japan

[73] Assignee: Nissan Chemical Industries, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/836,876
[22] PCT Filed: Nov. 14, 1995
[86] PCT No.: PCT/JP95/02318
§ 371 Date: May 28, 1997
§ 102(e) Date: May 28, 1997
[87] PCT Pub. No.: WO96/17026
PCT Pub. Date: Jun. 6, 1996

[30] Foreign Application Priority Data

Nov. 28, 1994 [JP] Japan .................................... 6-292790
Mar. 31, 1995 [JP] Japan .................................... 7-076281

[51] Int. Cl.$^7$ ..................................... C08F 20/00
[52] U.S. Cl. ......................... 525/438; 523/400; 525/113; 525/114; 525/115; 525/256; 525/279; 525/281; 525/326.1; 525/329.8; 525/329.9; 525/340; 525/347; 525/375; 525/374; 525/379; 525/404; 525/419; 525/449; 525/533
[58] Field of Search ..................... 524/89, 101; 525/256, 525/279, 281, 329.9, 375, 419, 449, 326.1, 379, 329.8, 340, 347, 374, 113, 114, 115, 404, 438, 533; 523/400

[56] References Cited

U.S. PATENT DOCUMENTS

| | | | |
|---|---|---|---|
| 3,620,983 | 11/1971 | Rinningen et al. | 528/365 |
| 3,624,180 | 11/1971 | Schmid et al. | 525/438 |
| 3,847,769 | 11/1974 | Garratt et al. | 525/531 |
| 4,085,159 | 4/1978 | Marsiat | 525/438 |
| 4,130,601 | 12/1978 | Ohoka et al. | 525/438 |
| 4,147,737 | 4/1979 | Sein et al. | 428/458 X |
| 4,471,108 | 9/1984 | Belder et al. | 528/272 |
| 4,499,239 | 2/1985 | Murakami et al. | 525/176 |
| 4,507,441 | 3/1985 | Goring | 525/533 |
| 4,528,341 | 7/1985 | Belder et al. | 525/438 |
| 4,910,287 | 3/1990 | McLafferty et al. | 525/437 |
| 5,097,006 | 3/1992 | Kapilow et al. | 528/272 |
| 5,250,634 | 10/1993 | Toyoda et al. | 525/533 |
| 5,262,510 | 11/1993 | Kwon et al. | 528/308 |
| 5,369,178 | 11/1994 | Miyazaki et al. | 525/227 |
| 5,436,311 | 7/1995 | Hoebeke et al. | 525/174 |
| 5,439,988 | 8/1995 | Moens et al. | 525/437 |
| 5,470,893 | 11/1995 | Sinclair-Day et al. | 524/519 |
| 5,491,202 | 2/1996 | Umehara et al. | 525/444 |
| 5,525,370 | 6/1996 | Hoebeke et al. | 427/195 |
| 5,596,037 | 1/1997 | Moens et al. | 524/539 |
| 5,728,779 | 3/1998 | van de Werff et al. | 525/438 |

*Primary Examiner*—Judy M. Reddick
*Attorney, Agent, or Firm*—Oblon, Spivak, McClelland, Maier & Neustadt, P.C.

[57] ABSTRACT

A resin composition for powder coating, which comprises the following components (A), (B) and (C): (A) a carboxyl group-containing resin having a number average molecular weight of from 1,000 to 20,000, an acid value of from 5 to 200 and a glass transition temperature of from 30 to 120° C.; (B) tris(β-methylglycidyl) isocyanurate of formula (1); and (C) as a ring opening polymerization inhibitor, at least one compound selected from the group consisting of amines having in their molecules a bond of formula (2); and onium salts.

5 Claims, No Drawings

RESIN COMPOSITION FOR POWDER COATING

TECHNICAL FIELD

The present invention relates to a resin composition for powder coating utilizing a carboxyl group-containing resin and an epoxy group-containing curing agent and provided with high impact resistance, weather resistance, etc.

BACKGROUND ART

At present, as a resin for powder coating, an epoxy resin, a polyester resin, a polyacrylic resin, a polyvinyl chloride resin or a polyethylene resin is, for example, used.

In recent years, a thermosetting resin is mainly used from the viewpoint of the smoothness and physical properties of the coating film. However, a thermosetting resin has a drawback that when a condensation type resin is used or when a blocked isocyanate is used as a curing agent, a condensation-liberated component or a blocking agent will form a gas at the time of curing, which in turn forms bubbles in the coating film. Therefore, as a curing agent preferred for powder coating, a polyglycidyl compound may, for example, be mentioned which is free from a component liberated during the curing reaction. However, when a usual glycidyl compound such as a bisphenol type diglycidyl ether, is used as a curing agent, a bisphenol type diglycidyl ether of a low molecular weight type is liquid at room temperature, and if it is melt-mixed with a carboxyl group-containing resin, followed by pulverization to obtain a powder coating, it brings about a problem that the powder undergoes fusion or blocking during the storage.

On the other hand, a bisphenol type diglycidyl ether of a high molecular weight type has a less number of functional groups (epoxy groups) per unit weight, and a larger amount will be required, which is disadvantageous from the viewpoint of the cost. Further, if a bisphenol type diglycidyl ether of a high molecular weight type is incorporated in a large amount, the melt viscosity of the coating material tends to be high, thus leading to a problem that smoothness of the coating film will be impaired.

Namely, the curing agent is usually desired to be solid at room temperature and have a low melt viscosity and a large number of functional groups per unit weight. As such a curing agent, a compound having three glycidyl groups or similar functional groups per molecule, such as triglycidyl isocyanurate or tris(β-methylglycidyl) isocyanurate, may, for example, be mentioned. Triglycidyl isocyanurate has high crystallizability and thus has a high melting point at a level of from 100 to 140° C. Accordingly, in order to mix it uniformly with the resin containing carboxyl groups, it will be necessary to conduct the kneading at a slightly high temperature (a temperature around the melting point). In addition, this triglycidyl isocyanurate is highly reactive, and a curing reaction between carboxyl groups and glycidyl groups tends to proceed to some extent to form powder coating even at the temperature for the kneading, whereby the flow property (fluidity) at the time of baking (heat curing) tends to decrease slightly, thus leading to formation of surface roughening so-called orange peel on the surface of the coating film.

On the other hand, tris(β-methylglycidyl) isocyanurate has a melting point of from 70 to 100° C., and it can be uniformly kneaded with the resin containing carboxyl groups at a relatively low temperature at a level of 100° C. or lower, whereby the curing reaction during the kneading can be suppressed. Therefore, it is free from the above-mentioned problem.

As a case wherein this tris(g-methylglycidyl) isocyanurate is employed, Japanese Unexamined Patent Publication No. 24244/1974 discloses a resin composition for powder coating, which comprises tris(β-methylglycidyl) isocyanurate and a polyester resin having an acid value of from 30 to 200 prepared from an aromatic dicarboxylic acid or its ester, a dihydroxy alcohol and a polybasic carboxylic acid.

Japanese Unexamined Patent Publication No. 94722/1974 discloses a method for producing a resin composition for powder coating comprising a free hydroxyl group-containing polyester resin, an acid anhydride and an epoxy compound such as tris(β-methylglycidyl) isocyanurate.

Japanese Unexamined Patent Publication No. 19832/1975 discloses a method for producing a resin composition for powder coating comprising a polyester resin containing a carboxyl group via an ester bond on a side chain and an epoxy compound such as tris(β-methylglycidyl) isocyanurate.

Japanese Unexamined Patent Publication No. 44130/1976 discloses a resin composition for powder coating, which comprises a polyester resin having free phenolic hydroxyl groups, a compound having at least two glycidyl groups and having a melting point of from 30 to 250° C., and/or an epoxy compound such as tris(β-methylglycidyl) isocyanurate, and/or a monomer radical-copolymerizable with a compound having an epoxy group. This composition may contain, as a catalyst, a tetraalkylammonium salt such as tetrabutylammonium bromide or tetraethylammonium chloride, an imidazole compound such as imidazole, 2-methyl-4-ethyl-imidazole or 2-methyl-imidazole, a tertiary amine such as triethylene diamine or N-methylmorpholine, or an organic carboxylic acid compound such as cobalt naphthenate or zinc naphthenate.

Japanese Unexamined Patent Publication No. 12823/1976 discloses a composition for powder coating having a polybasic carboxylic acid incorporated to a polymer made of a vinyl type monomer having a (methyl)glycidyl group, an unsaturated polyester having (methyl)glycidyl groups and other vinyl type monomers. To this composition, an acid, an alkali or an amine may be added in order to promote the curing reaction.

Japanese Unexamined Patent Publication No. 69935/1977 discloses a composition for powder coating having a certain polyester having a low acid value incorporated to a carboxyl group-containing polyester and triglycidyl isocyanurate or tris(β-methylglycidyl) isocyanurate.

Japanese Unexamined Patent Publication No. 63872/1992 discloses a composition for powder coating, which comprises a carboxyl group-containing resin and a polyglycidyl compound having from 2 to 6 glycidyl groups per molecule obtained by adding an epoxy compound such as tris(β-methylglycidyl) isocyanurate to a polyester oligomer having at least two carboxyl groups per molecule. This composition may contain a curing catalyst such as imidazole.

Japanese Unexamined Patent Publication No. 288373/1992 discloses a composition for powder coating, which comprises a basic resin and a curing agent, and further a curing catalyst. The basic resin is a resin having at least two carboxyl groups per molecule. As the curing agent, triglycidyl isocyanurate or a polyglycidyl compound having from 2 to 6 glycidyl groups, on average, per molecule obtained by adding tris(β-methylglycidyl) isocyanurate to a polyester oligomer having at least two carboxyl groups per molecule, is disclosed. Further, as the curing catalyst, a tertiary amine such as triethylamine, or an imidazole compound having a secondary amino group, such as imidazole or 2-ethylimidazole, is disclosed.

When an epoxy compound such as triglycidyl isocyanurate or tris(β-methylglycidyl) isocyanurate is added as a curing agent to a polyester resin having free hydroxyl groups, particularly free phenolic hydroxyl groups (—C$_6$H$_4$OH) as disclosed in Japanese Unexamined Patent Publications No. 94722/1974 and No. 44130/1976, to obtain a composition for powder coating, ether bonds formed by the reaction between phenolic hydroxyl groups and the above epoxy resin are not desirable as the weather resistance is poor, since the stability of phenoxy groups (—C$_6$H$_4$O—) is high, and the phenoxy groups tend to readily be liberated by light. Further, the polyester resin having free phenolic hydroxyl groups, has a low reactivity with the epoxy compound added as a curing agent, since the influence of H$^+$ (protons) attributable to the phenolic hydroxyl groups is small. Accordingly, for the purpose of increasing the reactivity, it is common to employ a method of adding a cure-promoting agent such as a tertiary amine.

On the other hand, Japanese Unexamined Patent Publications No. 24244/1974, No. 19832/1975, No. 69935/1977, No. 63872/1992 and No. 288373/1992 disclose compositions for powder coating having an epoxy compound such as triglycidyl isocyanurate or tris(β-methylglycidyl) isocyanurate added as a curing agent to a carboxyl group-containing resin.

In a composition for powder coating comprising a carboxyl group-containing resin and a curing agent having a glycidyl group, if triglycidyl isocyanurate is used as a curing agent for such a composition for powder coating, at the time of heat curing on a substrate, glycidyl groups in the triglycidyl isocyanurate have a high reactivity with carboxyl groups, and thus the carboxyl groups and the glycidyl groups react efficiently, whereby the desired curing reaction proceeds. However, in a case where tris(β-methylglycidyl) isocyanurate is employed as a curing agent for the resin containing carboxyl groups, homo-polymerization due to ring opening polymerization among β-methylglycidyl groups themselves is likely to take place at the time of heat curing on a substrate, whereby the desired curing reaction between carboxyl groups and β-methylglycidyl groups tends to hardly take place. Consequently, the curing will be inadequate, and the resulting coating film will have inadequate physical properties with respect to impact resistance, weather resistance, etc. It is considered that with the carboxyl group-containing polyester resin, the influence of H+(protons) attributable to the carboxyl groups is so large that homo-polymerization due to ring opening polymerization among β-methylglycidyl groups themselves takes place preferentially.

DISCLOSURE OF INVENTION

It is an object of the present invention to employ tris(β-methylglycidyl) isocyanurate and thereby to accomplish smoothening of the coating film by further improving the flow property (fluidity) during baking (heat curing) over a case where triglycidyl isocyanurate is employed and to solve the problem of homo-polymerization inherent to tris(β-methylglycidyl) isocyanurate and thereby to provide a resin composition for powder coating whereby a coating film having adequate impact resistance and weather resistance, can be obtained.

The present invention provides a resin composition for powder coating, which comprises the following components (A), (B) and (C):

(A) a carboxyl group-containing resin having a number average molecular weight of from 1,000 to 20,000, an acid value of from 5 to 200 and a glass transition temperature of from 30 to 120° C.;

(B) tris(β-methylglycidyl) isocyanurate of the formula (1):

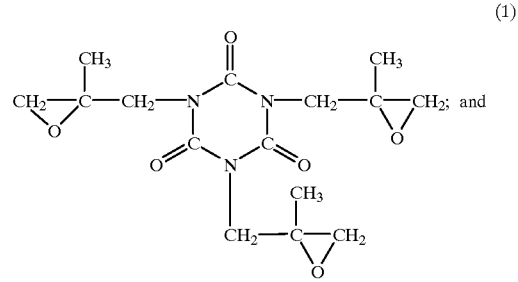

(C) as a ring opening polymerization inhibitor, at least one compound selected from the group consisting of amines having in their molecules a bond of the formula (2):

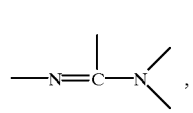

and onium salts.

BEST MODE FOR CARRYING OUT THE INVENTION

The resin composition for powder coating of the present invention may contain the above components (A) and (B) in such a ratio that the equivalent ratio of (β-methylglycidyl groups in component B)/(carboxyl groups in component A) is usually within a range of from 1.1 to 2.5, preferably from 1.2 to 2.0.

Further, the above component (C) may be contained usually in an amount of from 0.01 to 10 parts by weight, preferably from 0.05 to 5 parts by weight, per 100 parts by weight of the above component (A).

The resin containing carboxyl groups for component (A) to be used in the present invention has a number average molecular weight of from 1,000 to 20,000, preferably from 2,000 to 10,000, an acid value of from 5 to 200 (KOH-mg/g), preferably from 20 to 100 (KOH-mg/g) and a glass transition temperature of from 30 to 120° C., preferably from 40 to 80° C. In the present invention, any carboxyl group-containing resins obtained by using conventional materials and methods, may be used so long as they satisfy the above conditions. Among them, a polyester resin, a polyacrylic resin or a mixture thereof may preferably be employed as such a carboxyl group-containing resin.

The carboxyl group-containing resin for component (A) is preferably a polyester resin having carboxyl groups derived from an aliphatic carboxylic acid, or a polyester resin having carboxyl groups derived from an aromatic carboxylic acid having a pKa value of at most 4.0. For such polyester resins, the acid material giving carboxyl groups derived from an aliphatic carboxylic acid may, for example, be maleic acid, fumaric acid, mesaconic acid, itaconic acid, 3,6-endmethylene tetrahydrophthalic acid, tetrahydrophthalic acid, hexahydrophthalic acid, adipic acid or sebacic acid, and the acid material giving carboxyl groups derived from an aromatic carboxylic acid having a pKa value of at most 4.0 may, for example, be terephthalic acid or isophthalic acid. As an acid material giving carboxyl groups derived from an aromatic carboxylic acid having a preferred pKa value of at most 3.0, a nitro-modified or halogenated product of terephthalic acid or isophthalic acid, or phthalic acid, pyromellitic acid, trimellitic acid or a nitro-modified or halogenated product thereof, may, for example, be mentioned. The above pKa value is a dissociation index of a weak acid represented by pKa=−logKa where Ka is an acid dissociation constant, and in the case of a polybasic acid which undergoes dissociation in a plurality of steps, it is given by the first step dissociation index ($pK_1$). The above acid materials may be used in the form of organic acids themselves or may be used in the form of derivatives such as acid chlorides, acid esters or acid anhydrides. These acid materials may be used alone or in combination as a mixture of two or more different types.

As the acid material giving carboxyl groups to component (A), it is preferred to employ those mentioned above. However, a polycarboxylic acid to be used for the formation of the basic structure of the polyester resin may be any polycarboxylic acid or its derivative without being limited to the above-mentioned aliphatic carboxylic acids and aromatic carboxylic acids, so long as it is a polycarboxylic acid having at least two carboxyl groups per molecule.

On the other hand, the alcohol material may, for example, be ethylene glycol, diethylene glycol, propylene glycol, dipropylene glycol, butylene glycol, butanediol, butenediol or neopentyl glycol. These materials may be used alone or in combination as a mixture of two or more of them. These materials may be polymerized by a conventional method to obtain a polyester resin containing carboxyl groups, which satisfies the above-mentioned conditions for component (A).

For the above-mentioned polyacrylic resin, the material giving carboxyl groups may, for example, be acrylic acid or methacrylic acid. These materials may be used alone or in combination as a mixture. Further, an unsaturated compound may be copolymerized to such acrylic acid or methacrylic acid. Such an unsaturated compound may, for example, be an acrylic acid ester, a methacrylic acid ester or a monomer having an ethylenically unsaturated bond, and it may, for example, be an ester such as a methyl, ethyl, propyl, butyl, hexyl, octyl, benzyl, dodecyl, lauryl, phenyl or hydroxyethyl ester, of acrylic acid or methacrylic acid, a dialkylester such as a diethyl or dibutyl ester, of fumaric acid, a dialkyl ester such as a diethyl or dibutyl ester, of itaconic acid, a monomer such as acrylonitrile, acrylamide, styrene or vinyltoluene, or a cross-linking monomer such as diallyl phthalate or diallyl ether. These unsaturated compounds may be used alone or in combination as a mixture of two or more of them.

Component (B) to be used in the present invention is tris(β-methylglycidyl) isocyanurate of the formula (1) and serves as a curing agent in the resin composition for powder coating. This tris(β-methylglycidyl) isocyanurate can be prepared, for example, from isocyanuric acid and β-methylepihalogenohydrin by the following reaction:

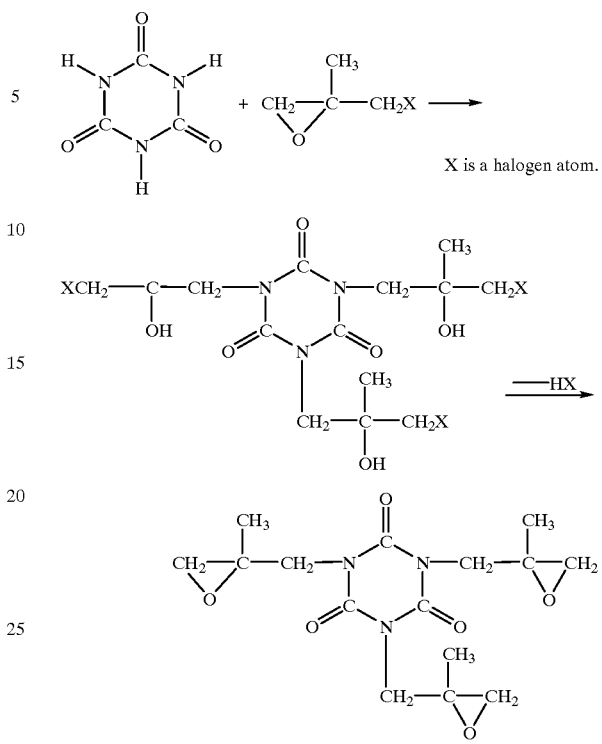

The tris(β-methylglycidyl) isocyanurate prepared by this method may sometimes contain by-products such as a dimer and a halogenohydrin as a precursor of epoxy. The smaller the content of such by-products, the better. However, even if a small amount of by-products are contained, no substantial influence over the resulting coating film is observed.

The amount of tris(β-methylglycidyl) isocyanurate to be added, is such that the equivalent ratio of total βmethylglycidyl groups inclusive of β-methylglycidyl groups in the above-mentioned by-products to the equivalent amount of carboxyl groups in component (A) is within a range of from 1.1 to 2.5.

Component (C) to be used in the present invention is at least one compound selected from the group consisting of onium salts and amines having in their molecules a bond of the formula (2). This component (C) serves as a ring opening polymerization inhibitor in the resin composition for powder coating of the present invention.

The amines having in their molecules a bond of the formula (2), for the above component (C), may have a chain structure or a cyclic structure. However, amines having a cyclic structure are preferred. Such cyclic amines having in their molecules a bond of the formula (2) include, for example, imidazole and imidazole derivatives. Further, such cyclic amines preferably have a structure of the formula (3):

(3)

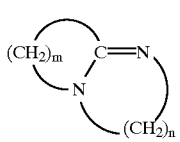

wherein m is an integer of from 2 to 11, and n is an integer of 2 or 3. With such a bicyclic structure, water resistance upon curing of the powder resin composition will be improved. As the amines having a structure of the above formula (3), 1,8-diaza-bicyclo(5,4,0)undecene-7 and 1,5-diaza-bicyclo(4,3,0)nonene-5 may, for example, be mentioned.

1,8-Diaza-bicyclo(5,4,0)undecene-7 is a compound of the following formula (12):

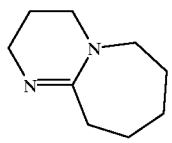

(12)

1,5-Diaza-bicyclo(4,3,0)-nonene-5 is a compound of the following formula (13):

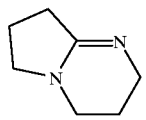

(13)

The onium salts for the above component (C) may, for example, be ammonium salts, phosphonium salts, arsonium salts, stibonium salts, oxonium salts, sulfonium salts, selenonium salts, stannonium salts or iodonium salts.

The onium salts for this component (C) are preferably quaternary ammonium salts having a structure of the formula (4):

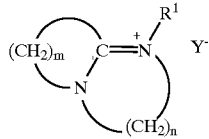

(4)

wherein m is an integer of from 2 to 11, n is an integer of 2 or 3, $R^1$ is an alkyl group or an aryl group, and $Y^-$ is an anion; quaternary ammonium salts having a structure of the formula (5): $R^2R^3R^4R^5N^+Y^-$ wherein each of $R^2$, $R^3$, $R^4$ and $R^5$ is an alkyl group or an aryl group, N is a nitrogen atom, and $Y^-$ is an anion, provided that $R^2$, $R^3$, $R^4$ and $R^5$ are respectively bonded to the nitrogen atom by a C-N bond; quaternary ammonium salts having a structure of the formula (6):

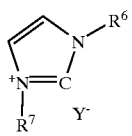

(6)

wherein each of $R^6$ and $R^7$ is an alkyl group or an aryl group, and $Y^-$ is an anion; quaternary ammonium salts having a structure of the formula (7):

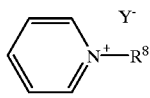

(7)

wherein $R^8$ is an alkyl group or an aryl group, and $Y^-$ is an anion; quaternary ammonium salts having a structure of the formula (8):

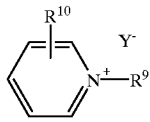

(8)

wherein each of $R^9$ and $R^{10}$ is an alkyl group or an aryl group, and $Y^-$ is an anion; tertiary ammonium salts having a structure of the formula (9):

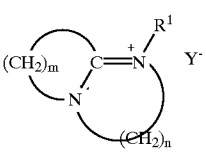

(9)

wherein m is an integer of from 2 to 11, n is an integer of 2 or 3, H is a hydrogen atom, and $Y^-$ is an anion; quaternary phosphonium salts having a structure of the formula (10): $R^{11}R^{12}R^{13}R^{14}P^+Y^-$ wherein each of $R^{11}$, $R^{12}$, $R^{13}$ and $R^{14}$ is an alkyl group or an aryl group, P is a phosphorus atom, and $Y^-$ is an anion, provided that $R^{11}$, $R^{12}$, $R^{13}$ and $R^{14}$ are respectively bonded to the phosphorus atom by a C-P bond; and tertiary sulfonium salts having a structure of the formula (11): $R^{15}R^{16}R^{17}S^+Y^-$ wherein each of $R^{15}$, $R^{16}$ and $R^{17}$ is an alkyl group or an aryl group, and $Y^-$ is an anion, provided that $R^{15}$, $R^{16}$ and $R^{17}$ are respectively bonded to the sulfur atom by a C—S bond.

To choose these onium salts is preferred from the viewpoint of the effect for preventing discoloration of the cured product at a high temperature.

The compounds of the formula (4) are quaternary ammonium salts derived from amines of the formula (3), wherein m is an integer of from 2 to 11, and n is an integer of 2 or 3. Particularly preferred are quaternary ammonium salts derived from amines of the formulas (12) and (13). $R^1$ of such quaternary ammonium salts is a $C_{1-18}$, preferably $C_{2-10}$, alkyl or aryl group and may, for example, be a straight chain alkyl group such as an ethyl group, a propyl group or a butyl group, a benzyl group, a cyclohexyl group, a cyclohexylmethyl group or a dicyclopentadienyl group. The anion ($Y^-$) may for example, be a halogen ion such as a chloride ion ($Cl^-$), a bromide ion ($Br^-$) or an iodide ion ($I^-$), or an acid group such as carboxylate (—$COO^-$), sulfonate (—$SO_3^-$) or alcoholate (—$O^-$). A compound having a chloride ion and a bromide ion as counter ions is preferred, since it improves the water resistance of the cured product, and it provides an effect for preventing discoloration of the cured product at a high temperature. The compound of the formula (4) may be available as a commercial product, but can be produced, for example, by a reaction of a compound of the formula (12) or a compound of the formula (13) with an alkyl or aryl halide such as butyl bromide or benzyl chloride.

The compounds of the above formula (5) are quaternary ammonium salts of the formula $R^2R^3R^4R^5N^+Y^-$. Each of $R^2$, $R^3$, $R^4$ and $R^5$ of the quaternary ammonium salt is a $C_{1-18}$ alkyl or aryl group. To improve the water resistance, the total number of carbon atoms of $R^2$ to $R^5$ is preferably at least 9. Further, in order to improve the water resistance, at least one alkyl or aryl group among $R^2$, $R^3$, $R^4$ and $R^5$ preferably has from 6 to 18 carbon atoms. The anion ($Y^-$) may, for example, be a halogen ion such as a chloride ion ($Cl^-$), a bromide ion ($Br^-$) or an iodide ion ($I^-$), or an acid group such as carboxylate (—$COO^-$), sulfonate (—$SO_3^-$) or alcoholate (—$O^-$). However, a compound having a chloride ion and a bromide ion as counter ions is preferred, since it improve the water resistance of the cured product and has an effect for preventing discoloration of the cured product at a high temperature. The quaternary ammonium salts of the formula (5) are available as commercial products and may, for example, be triethylbenzylammonium chloride, triethylbenzylammonium bromide, trioctylmethylammonium chloride, tributylbenzylammonium chloride, and trimethylbenzylammonium chloride. The compounds of the above formula (6) are quaternary ammonium salts derived from 1-substituted imidazole, wherein each of $R^6$ and $R^7$ preferably has from 1 to 18 carbon atoms, and the total number of carbon atoms of $R^6$ and $R^7$ is preferably at least 7. For example, $R^6$ may be a methyl group, an ethyl group, a propyl group, a phenyl group or a benzyl group, and $R^7$ may be a benzyl group, an octyl group or an octadecyl group. The anion ($Y^-$) may, for example, be a halogen ion such as a chloride ion ($Cl^-$), a bromide ion ($Br^-$) or an iodide ion ($I^-$), or an acid group such as carboxylate (—$COO^-$), sulfonate (—$SO_3^-$) or alcoholate (—$O^-$). However, a compound having a chloride ion and a bromide ion as counter ions is preferred, since it improves the water resistance of the cured product and has an effect for preventing discoloration of the cured product at a high temperature. The compounds of the formula (6) may be available as commercial products, but can be produced, for example, by reacting an imidazole compound such as 1-methylimidazole or 1-benzylimidazole with an alkyl or aryl halide such as benzyl bromide or methyl bromide.

The compounds of the above formula (7) are quaternary ammonium salts derived from pyridine, wherein $R^8$ is a $C_{1-18}$, preferably $C_{4-18}$ alkyl or aryl group and may, for example, be a butyl group, an octyl group, a benzyl group or a lauryl group. The anion ($Y^-$) may, for example, be a halogen ion such as a chloride ion ($Cl^-$), a bromide ion ($Br^-$) or an iodide ion ($I^-$), or an acid group such as carboxylate (—$COO^-$), sulfonate (—$SO_3^-$) or alcoholate (—$O^-$). However, a compound having a chloride ion and a bromide ion as counter ions is preferred, since it improves the water resistance of the cured product and has an effect for preventing discoloration of the cured product at a high temperature. The compounds of this formula (7) may be available as commercial products, but can be produced, for example, by reacting pyridine with an alkyl or aryl halide such as lauryl chloride, benzyl chloride, benzyl bromide, methyl bromide or octyl bromide. The compounds of this formula (7) may, for example, be N-laurylpyridinium chloride and N-benzylpyridinium bromide.

The compounds of the above formula (8) are quaternary ammonium salts derived from substituted pyridines represented by e.g. picoline, wherein $R^9$ is a $C_{1-18}$, preferably $C_{4-18}$, alkyl or aryl group and may, for example, be a methyl group, an octyl group, a lauryl group or a benzyl group. $R^{10}$ is a $C_{1-18}$ alkyl or aryl group, and in a case of a quaternary ammonium derived from picoline, $R^{10}$ is a methyl group. The anion ($Y^-$) may, for example, be a halogen ion such as a chloride ion ($Cl^-$), a bromide ion ($Br^-$) or an iodide ion ($I^-$), or an acid group such as carboxylate (—$COO^-$), sulfonate (—$SO_3^-$) or alcoholate (—$O^-$). However, a compound having a chloride ion and a bromide ion as counter ions is preferred, since it improves the water resistance of the cured product and has an effect for preventing discoloration of the cured product at a high temperature. The compounds of this formula (8) may be available as commercial products, but can be produced, for example, by reacting a substituted pyridine such as picoline with an alkyl or aryl halide, such as methyl bromide, octyl bromide, lauryl chloride, benzyl chloride or benzyl bromide. The compounds of this formula (8) may, for example, be N-benzylpicolinium chloride, N-benzylpicolinium bromide and N-laurylpicolinium chloride.

The compounds of the the above formula (9) are tertiary ammonium salts derived from amines of the formula (3), wherein m is an integer of from 2 to 11, and n is an integer of 2 or 3. Particularly preferred are tertiary ammonium salts derived from amines of the formulas (12) and (13). The anion ($Y^-$) may, for example, be a halogen ion such as a chloride ion ($Cl^-$), a bromide ion ($Br^-$) or an iodide ion ($I^-$), or an acid group such as carboxylate (—$COO^-$), sulfonate (—$SO_3^-$) or alcoholate (—$O^-$). The compounds of the above formula (9) may be available as commercial products, but can be prepared, for example, by a reaction of the compound of the formula (12) or the compound of the formula (13) with a weak acid such as a carboxylic acid or phenol. As the carboxylic acid, formic acid or acetic acid may, for example, be mentioned. In a case where formic acid is used, the anion ($Y^-$) will be ($HCOO^-$), and in a case where acetic acid is used, the anion ($Y^-$) will be ($CH_3COO^-$). Further, in a case where phenol is used, the anion ($Y^-$) will be ($C_6H_5O^-$).

The compounds of the above formula (10) are quaternary phosphonium salts having a structure of the formula $R^{11}R^{12}R^{13}R^{14}P^+Y^-$. Each of $R^{11}$, $R^{12}$, $R^{13}$ and $R^{14}$ is a $C_{1-18}$ alkyl or aryl group. Preferably, three out of four substituents $R^{11}$ to $R^{14}$ are phenyl groups or substituted phenyl groups, such as phenyl groups or tolyl groups, and the remaining one substituent is a $C_{1-18}$ alkyl or aryl group. The anion ($Y^-$) may, for example, be a halogen ion such as a chloride ion ($Cl^-$), a bromide ion ($Br^-$) or an iodide ion ($I^-$), or an acid group such as carboxylate (—$COO^-$), sulfonate (—$SO_3^-$) or alcoholate (—$O^-$). However, a compound having a chloride ion and a bromide ion as counter ions is preferred, since it improves the water resistance of the cured product and has an effect for preventing discoloration of the cured product at a high temperature. The compounds of this formula (10) are available as commercial products, and they may, for example, be a tetraalkylphosphonium halide such as tetra n-butylphosphonium halide or tetra n-propylphosphonium halide, a trialkylbenzylphosphonium halide such as triethylbenzylphosphonium halide, a triphenylmonoalkylphosphonium halide such as triphenylmethylphosphonium halide or triphenylethylphosphonium halide, a triphenylbenzylphosphonium halide, a tetraphenylphosphonium halide, a tritolylmonoarylphosphonium halide, or a tritolylmonoalkylphosphonium halide (the halogen atom may be a chlorine atom or a bromine atom). Particularly preferred is a triphenylmonoalkylphosphonium halide such as triphenylmethylphosphonium halide or triphenylethylphosphonium halide, a triphenylmonoarylphosphonium halide such as triphenylbenzylphosphonium halide, a tritolylmonoarylphosphonium halide such as tritolylmonophenylphosphonium halide, or a tritolylmonoalkylphosphonium halide such as tritolylmonomethylphosphonium halide (the halogen atom may be a chlorine atom or a bromine atom). Use of these compounds is preferred from the viewpoint of the effect for preventing discoloration of the cured product at a high temperature.

The compounds of the above formula (11) are tertiary sulfonium salts having a structure of the formula $R^{15}R^{16}R^{17}S^+Y^-$. Each of $R^{15}$, $R^{16}$ and $R^{17}$ is a $C_{1-18}$ alkyl or aryl group. The anion ($Y^-$) may, for example, be a halogen ion such as a chloride ion ($Cl^-$), a bromide ion ($Br^-$) or an iodide ion ($I^-$), or an acid group such as carboxylate ($—COO^-$), sulfonate ($—SO_3^-$) or alcoholate ($—O^-$). However, a compound having a chloride ion and a bromide ion as counter ions is preferred, since it improves the water resistance of the cured product and has an effect for preventing discoloration of the cured product at a high temperature. The compounds of this formula (11) are available as commercial products and may, for example, be triphenylsulfonium chloride, triphenylsulfonium bromide or tritolylsulfonium chloride.

Component (C) to be used in the present invention is preferably at least one onium salt selected from the group consisting of compounds of the above formulas (4), (6), (7), (8), (9), (10) and (11). By using such onium salts, the coating film obtained by curing the resin composition for powder coating, undergoes no discoloration, and the water resistance will also be improved.

Especially, component (C) to be used in the present invention is more preferably a compound of the formula (7), a compound of the formula (8), a compound of the formula (10) or a compound of the formula (11), or a mixture of these compounds, from the viewpoint of improvement of the water resistance and the effect for preventing discoloration.

Most preferably, component (C) to be used in the present invention is a halogenated triphenylmonoalkyl phosphate, a halogenated triphenylmonoaryl phosphate, or a mixture thereof (provided that the halogen atom is a chlorine atom or a bromine atom). These onium salts have an effect of further improving the water resistance of a coating film obtainable by curing the resin composition for powder coating and yet have the most excellent effect for preventing discoloration.

The method of adding a predetermined amount of the ring opening polymerization inhibitor of component (C) to be used in the present invention in a conventional manner during the preparation of the powder coating, may, for example, be a first method in which component (C) is melt-mixed with the carboxyl group-containing resin of component (A) and the curing agent of component (B) together with optional pigments or other additives, or a second method in which component (C) is preliminarily mixed to the carboxyl group-containing resin of component (A) and then melt-mixed with component (B) and other components. In the second method, the ring opening polymerization inhibitor of component (C) may be added at the same time as charging the dicarboxylic acid component and the glycol component as materials for component (A), a modifier component and the polymerization catalyst into the reactor, so that the polyester resin is produced in the presence of component (C). In the second method, when e.g. triphenylbenzylphosphonium bromide is used as component (C), triphenylphosphine and benzylbromide may be added at the time of polymerization of the resin for component (A), so that triphenylbenzylphosphonium bromide may be prepared at the same time as polymerization of the resin. Further, a functional group having a ring opening polymerization inhibiting ability may be incorporated into the resin structure. In the above second method, the compound of the formula (9) may be incorporated in component (A) by preliminarily melt-mixing the compound of the formula (12) or (13) with the carboxyl group-containing resin of component (A), so that component (A) and the compound of the formula (12) or (13) are reacted to form the compound of the formula (9). However, the compound of the formula (9) prepared from the compound of the formula (12) or (13) in component (A) partially dissociates into a compound of the formula (12) or (13) by the heat during melting.

In the present invention, various additives for powder coating may be incorporated as the case requires. Such optional components include, for example, an acrylic acid alkyl ester as an agent for improving the smoothness of the coating film, titanium dioxide as a coloring pigment, an inorganic pigment such as iron oxide, carbon, phthalocyanine, an organic pigment such as a diazo compound as well as a degassing agent, an antistatic agent, a flame retardant, a plasticizer, a flow control agent, an ultraviolet absorber and an antioxidant.

The resin composition for powder coating of the present invention may be prepared by a conventional method. For example, it may be obtained by mixing components (A), (B) and (C) together with optional components, melt-kneading the mixture at a temperature of from 70 to 120° C., preferably from 70 to lower than 100° C., followed by cooling, pulverization and sieving. The above melt-kneading can be carried out by means of a usual single screw or twin screw extruder such as a co-kneader manufactured by Buss Co. The pulverization can be carried out by means of a usual dry pulverizer such as hammer mill or a jet mill. The obtained pulverized product is sieved by a screen of from 50 to 200 mesh, preferably from 100 to 200 mesh to obtain the resin composition for powder coating of the present invention in the form of a powder.

The resin composition for powder coating of the present invention has a high level of storage stability such that even when stored at room temperature for more than 6 months, the powder undergoes no fusion (blocking) during the storage.

The resin composition for powder coating of the present invention may be used for a usual substrate of e.g. chemically treated aluminum, anodized aluminum or chemically treated steel.

The resin composition for powder coating of the present invention may be deposited on a substrate by a common electrostatic powder coating method or a fluidized dipping method and then heated at a temperature of from 140 to 230° C. for from 10 to 30 minutes for curing to obtain a coating film having adequate impact resistance and weather resistance. The above heating can be carried out by a commonly employed apparatus such as a hot air circulating baking furnace. Thus, it is possible to form a film having a thickness of from 30 to 300 μm on the substrate.

If the number average molecular weight of the carboxyl group-containing resin of component (A) to be used in the present invention is less than 1,000, the film strength when formed into a film tends to be low, and if it exceeds 20,000, the flow property during the baking tends to be low, whereby it tends to be difficult to obtain a smooth coating film. If the acid value is less than 5, the content of carboxyl groups is small, and the reaction with the curing agent tends to be inadequate, whereby the curing tends to be low, and no adequate film strength will be obtained. On the other hand, if the acid value exceeds 200, the crosslinking density tends to be unnecessarily high, whereby the impact resistance tends to be low. If the glass transition temperature is lower than 30° C., fusion (blocking) is likely to occur during the storage, and if it exceeds 120° C., it tends to be difficult to uniformly mix it with the curing agent during the kneading, and the flow property during the baking tends to be low, whereby it will be difficult to obtain a smooth coating film.

As the carboxyl group-containing resin of component (A), it is preferred to employ polyester resin, a polyacrylic resin or a mixture thereof. Particularly preferred as this component (A) is a polyester resin having carboxyl groups derived from an aliphatic carboxylic acid, or a polyester resin having carboxyl groups derived from an aromatic carboxylic acid having a pKa value of at most 4.0. This is believed attributable to the fact that the reactivity for the curing reaction by heating with tris(β-methylglycidyl) isocyanurate as a curing agent, is substantially influenced by the mobility of carboxyl groups. With carboxyl groups derived from an aliphatic carboxylic acid, the mobility during the heating for curing is substantial, whereby the reaction of β-methylglycidyl groups and carboxyl group is effectively accomplished. On the other hand, with carboxyl groups derived from an aromatic carboxylic acid, the mobility of carboxyl groups is restricted by the aromatic ring, whereby there is a problem with respect to the reactivity. Namely, carboxyl groups derived from an aromatic carboxylic acid having a pKa value of at most 4.0 are disadvantageous from the steric and mobility point of view, but the nucleophilic nature of such carboxyl groups is high, whereby the reactivity with β-methylglycidyl groups is believed to be improved. Further, carboxyl groups derived from an aromatic carboxylic acid having a pKa value of at most 3.0, are preferred, since the nucleophilic nature will be higher, and the reactivity will be further improved.

With respect to tris(β-methylglycidyl) isocyanurate of component (B) to be used in the present invention, the maximum absorption wavelength (Amax) in the UV absorption wavelength is a wavelength of not longer than 190 nm, which is not substantially contained in the sun light, and it is excellent in the weather resistance, since it has, as a basic structure, a triazine ring having a high bond energy. However, β-methylglycidyl groups of this tris(β-methylglycidyl) isocyanurate are more readily susceptible to ring opening of the epoxy rings by protons (H$^+$) attributable to the carboxyl group-containing resin, than glycidyl groups of triglycidyl isocyanurate, wherein the β-position is a hydrogen atom, by such an influence that methyl groups located at the β-position exhibit an electron donative nature, whereby ring opening polymerization among β-methylglycidyl groups is believed to proceed preferentially.

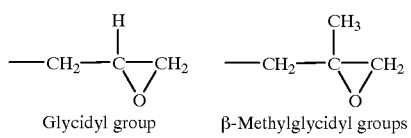

Glycidyl group    β-Methylglycidyl groups

As a result, β-methylglycidyl groups are consumed, and the number of β-methylglycidyl groups which should otherwise be used for the curing reaction with carboxyl groups, tends to be small, whereby crosslinking will be inadequate, no adequate curing will be accomplished, and unsatisfactory physical properties will be obtained. It has now been found that by adding the above component (C), it is possible to suppress the ring opening polymerization among β-methylglycidyl groups themselves (to suppress the homopolymerization). Further, due to a steric hindrance by methyl groups located at the β-position, tris(β-methylglycidyl) isocyanurate has a lower reactivity with carboxyl groups, than triglycidyl isocyanurate wherein the β-position is a hydrogen atom. It has also been found that by the addition of the above component (C), that reaction can be promoted (the curing can be promoted).

Further, hydroxyl groups formed by the curing reaction between β-methylglycidyl groups and carboxyl groups, also react with β-methylglycidyl groups and thus reduce the number of β-methylglycidyl groups which are otherwise useful for the curing reaction with carboxyl groups, thus leading to inadequate curing. The same phenomenon appears also in a case where triglycidyl isocyanurate is used as the curing agent. However, in this case, curing is possible even when the equivalent ratio of (glycidyl groups)/(carboxyl groups) is less than 1.0. Whereas, in the case of tris(β-methylglycidyl) isocyanurate, it is preferred to set the equivalent ratio of (β-methylglycidyl groups)/(carboxyl groups) at a level of from 1.1 to 2.5 in consideration of the possibility that β-methylglycidyl groups themselves undergo homo-polymerization to some extent in spite of the incorporation of component (C). If component (C) is incorporated excessively, this equivalent ratio can be reduced to the same level as in the above-mentioned case of triglycidyl isocyanurate. However, such is not advisable, since curing will also be promoted, whereby the flow property will be impaired. If the equivalent ratio of (β-methylglycidyl groups)/(carboxyl groups) exceeds 2.5, the crosslinking density tends to be unnecessarily high, whereby the impact resistance tends to decrease, such being undesirable.

If component (C) to be used in the present invention is a usual accelerator which is commonly employed to accelerate the curing reaction between glycidyl groups and carboxyl groups, such as a tertiary amine represented by triethylamine, a tertiary phosphine represented by triphenylphosphine or trialkylphosphine, or boron trifluoride, the homo-polymerization inhibition ability is very low, such being undesirable. Further, a tertiary amine represented by triethylamine and a tertiary phosphine represented by triphenylphosphine are not desirable, since they tend to cause discoloration of the cured coating film.

However, when triarylphosphines represented by triphenylphosphine and tritolylphosphine are used as component (C) in the present invention, the homo-polymerization inhibition ability is higher than the tertiary amine, although their homo-polymerization inhibition ability is lower than onium salts. These triarylphosphines have a critical range for the amount of addition, and they can be employed if they are used in an amount of from 0.5 to 10 parts by weight per 100 parts by weight of component (A).

Further, as a boron trifluoride complex, a boron trifluoride monoalkylamine complex such as boron trifluoride monoethylamine or boron trifluoride monobutylamine, or a boron trifluoride etherate such as boron trifluoride diethyl ether, is not desirable, since it tends to promote homopolymerization i.e. ring opening polymerization among g-methylglycidyl groups themselves, and it is likely to cause discoloration when heated at a high temperature.

In the present invention, the amount of component (C) is from 0.01 to 10 parts by weight per 100 parts by weight of component (A). This is the range of the amount of addition in which the resin composition for powder coating of the present invention is free from cobwebbing, and the time for gelation is from 20 seconds to 30 minutes, preferably from one minute to 20 minutes. Component (C) serves not only as an agent for inhibiting homo-polymerization of β-methylglycidyl groups themselves, but also as an accelerator for the curing reaction between β-methylglycidyl groups and carboxyl groups. Accordingly, if the amount of component (C) exceeds 10 parts by weight, the time until gelation will be less than 20 seconds, whereby the flow property during curing will be inadequate, and it tends to be difficult to obtain a smooth coating film. On the other hand, if the amount of component (C) is less than 0.01 part by weight, curing tends to be inadequate, such being undesirable.

Now, the present invention will be described in further detail with reference to Examples. However, it should be understood that the present invention is by no means restricted by such specific Examples.

The following materials were prepared.

A1: Carboxyl group-containing polyester resin [P-2400, tradename, manufactured by DSM K.K., carboxyl equivalent: 1840 g/eq, acid value: 30.5 (KOH-mg/g), number average molecular weight: 3680, glass transition temperature: about 63° C.]

A2: Carboxyl group-containing polyester resin [carboxyl equivalent: 1130 g/eq, acid value: 49.7 (KOH-mg/g), number average molecular weight: 4520, glass transition temperature: about 75° C.]

A3: Carboxyl group-containing polyester resin [carboxyl equivalent: 2200 g/eq, acid value: 25.5 (KOH-mg/g), number average molecular weight: 4400, glass transition temperature: about 60° C.]

B1: Tris(β-methylglycidyl) isocyanurate [epoxy equivalent: 124 g/eq]

B2: Triglycidyl isocyanurate [TEPIC, tradename, manufactured by Nissan Chemical Industries, Ltd., epoxy equivalent: 105 g/eq]

C1: Benzyltriphenylphosphonium bromide [SA5003, tradename, manufactured by Sunapro K.K.]

C2: 1,8-Diaza-bicyclo(5,4,0)undecene-7 [DBU, tradename, manufactured by Sunapro K.K.]

C3: Triphenylsulfonium chloride [reagent]

C4: N-laurylpyridinium chloride [reagent]

C5: Tributylamine [commercially available reagent]

C6: Tributylphosphine [reagent]

C7: Boron trifluoride monoethylamine complex [reagent]

D1: Flow control agent [Modaflow P-3, tradename, manufactured by Monsanto Chemical Co., Ltd.]

E1: Degassing agent [Benzoin, tradename, manufactured by Wako Junyaku K.K.]

F1: White pigment (main component being titanium oxide) [Cronos 2160, tradename, manufactured by Cronos Titan GMBH K.K.]

Preparation of carboxyl group-containing polyester resin A2

Into a reactor equipped with a rectifying column and a stirrer, 100 g of terephthalic acid dimethyl ester, 107 g of neopentyl glycol and 0.2 g of zinc acetate were charged and reacted under heating while distilling methanol off out of the system. After the distillation of methanol terminated, the product was transferred to a polymerization reactor equipped with a stirrer and flushed with nitrogen, and 0.1 g of antimony trioxide and 0.11 g of trimethyl phosphate were further added. A reaction was carried out at 250° C. under atmospheric pressure for 30 minutes, followed by a reaction under a reduced pressure of about 25 mmHg for 30 minutes. 100 g of the resin thereby obtained and 10.0 g of trimellitic anhydride were reacted at 180° C. for 30 minutes in a polymerization reactor equipped with a stirrer. The obtained polyester resin had a carboxyl equivalent of 1130 g/eq, an acid value of 49.7 (KOH-mg/g), a number average molecular weight of 4520 and a glass transition temperature of about 75° C.

Preparation of carboxyl group-containing polyester resin A3

Into a reactor equipped with a rectifying column and a stirrer, 100 g of terephthalic acid dimethyl ester, 107 g of neopentyl glycol and 0.2 g of zinc acetate were charged and reacted under heating while distilling methanol off out of the system. After the distillation of methanol terminated, the product was transferred to a polymerization reactor equipped with a stirrer and flushed with nitrogen, and 0.1 g of antimony trioxide and 0.11 g of trimethyl phosphate were further added. A reaction was carried out at 250° C. under atmospheric pressure for 30 minutes, followed by a reaction under a reduced pressure of about 25 mmHg for 30 minutes. 100 g of the resin thereby obtained and 7.8 g of cyclohexane dicarboxylic anhydride were reacted at 180° C. for 30 minutes in a polymerization reactor equipped with a stirrer. The obtained polyester had a carboxyl equivalent of 2200 g/eq, an acid value of 25.5 (KOH-mg/g), a number average molecular weight of 4400 and a glass transition temperature of about 60° C.

EXAMPLE 1

891.7 g of carboxyl group-containing polyester resin (A1), 90.8 g of tris(g-methylglycidyl) isocyanurate (B1), 4.46 g of benzyltriphenylphosphonium bromide (C1), 10.0 g of a flow control agent (D1) and 3.0 g of a degassing agent (E1) were put into a kneader and melt-mixed at a temperature of 90° C. Then, the mixture was cooled to room temperature and pulverized by means of a household mixer. This pulverized product was sieved with a screen of 150 mesh to obtain a resin composition for powder coating. The above blend composition was shown in Table 1.

EXAMPLES 2 TO 14

With the blend components as identified in Table 1, resin compositions for powder coating of Examples 2 to 14 were prepared in the same manner as in Example 1.

COMPARATIVE EXAMPLE 1

895.8 g of carboxyl group-containing polyester resin (Al), 91.2 g of tris(β-methylglycidyl) isocyanurate (B1), 10.0 g of a flow control agent (D1) and 3.0 g of a degassing agent (E1) were put into a kneader and melt-mixed at a temperature of 90° C. Then, the mixture was cooled to room temperature and pulverized by means of a household mixer. This pulverized product was sieved by a screen of 150 mesh to obtain a resin composition for powder coating. The above blend composition was shown in Table 2.

COMPARATIVE EXAMPLES 2 TO 14

With the blend components as identified in Table 2, resin compositions for powder coating of Comparative Examples 2 to 14 were prepared in the same manner as in Comparative Example 1. However, in Comparative Examples 5 and 14, the melt mixing was carried out at a temperature of 120° C.

TABLE 1

(unit: gram)

| Components | Examples | | | | | |
| --- | --- | --- | --- | --- | --- | --- |
| | 1 | 2 | 3 | 4 | 5 | 6 |
| A1 | 891.70 | 577.30 | 571.10 | 571.10 | 583.90 | 559.90 |
| A2 | 0 | 0 | 0 | 0 | 0 | 0 |
| A3 | 0 | 0 | 0 | 0 | 0 | 0 |

TABLE 1-continued (unit: gram)

| | | | | | | |
|---|---|---|---|---|---|---|
| B1 | 90.80 | 53.90 | 63.00 | 63.00 | 47.20 | 75.50 |
| B2 | 0 | 0 | 0 | 0 | 0 | 0 |
| C1 | 4.46 | 5.77 | 2.86 | 0 | 5.84 | 1.68 |
| C2 | 0 | 0 | 0 | 2.86 | 0 | 0 |
| C3 | 0 | 0 | 0 | 0 | 0 | 0 |
| C4 | 0 | 0 | 0 | 0 | 0 | 0 |
| C5 | 0 | 0 | 0 | 0 | 0 | 0 |
| C6 | 0 | 0 | 0 | 0 | 0 | 0 |
| C7 | 0 | 0 | 0 | 0 | 0 | 0 |
| D1 | 10.00 | 10.00 | 10.00 | 10.00 | 10.00 | 10.00 |
| E1 | 3.00 | 3.00 | 3.00 | 3.00 | 3.00 | 3.00 |
| F1 | 0 | 350.00 | 350.00 | 350.00 | 350.00 | 350.00 |

| | Examples | | | | | |
|---|---|---|---|---|---|---|
| Components | 7 | 8 | 9 | 10 | 11 | 12 |
| A1 | 0 | 0 | 100.00 | 100.00 | 100.00 | 100.00 |
| A2 | 542.00 | 0 | 0 | 0 | 0 | 0 |
| A3 | 0 | 579.00 | 0 | 0 | 0 | 0 |
| B1 | 89.80 | 49.30 | 9.44 | 9.44 | 9.44 | 9.44 |
| B2 | 0 | 0 | 0 | 0 | 0 | 0 |
| C1 | 5.42 | 8.69 | 1.00 | 0 | 0 | 0 |
| C2 | 0 | 0 | 0 | 1.00 | 0 | 0 |
| C3 | 0 | 0 | 0 | 0 | 1.00 | 0 |
| C4 | 0 | 0 | 0 | 0 | 0 | 1.00 |
| C5 | 0 | 0 | 0 | 0 | 0 | 0 |
| C6 | 0 | 0 | 0 | 0 | 0 | 0 |
| C7 | 0 | 0 | 0 | 0 | 0 | 0 |
| D1 | 10.00 | 10.00 | 0 | 0 | 0 | 0 |
| E1 | 3.00 | 3.00 | 0 | 0 | 0 | 0 |
| F1 | 0 | 0 | 0 | 0 | 0 | 0 |

| | Examples | |
|---|---|---|
| Components | 13 | 14 |
| A1 | 0 | 0 |
| A2 | 100.00 | 0 |
| A3 | 0 | 100.00 |
| B1 | 15.36 | 7.90 |
| B2 | 0 | 0 |
| C1 | 1.00 | 1.00 |
| C2 | 0 | 0 |
| C3 | 0 | 0 |
| C4 | 0 | 0 |
| C5 | 0 | 0 |
| C6 | 0 | 0 |
| C7 | 0 | 0 |
| D1 | 0 | 0 |
| E1 | 0 | 0 |
| F1 | 0 | 0 |

TABLE 2

(unit: gram)

| | Comparative Examples | | | | | |
|---|---|---|---|---|---|---|
| Components | 1 | 2 | 3 | 4 | 5 | 6 |
| A1 | 895.80 | 596.80 | 582.60 | 573.70 | 602.60 | 577.30 |
| A2 | 0 | 0 | 0 | 0 | 0 | 0 |
| A3 | 0 | 0 | 0 | 0 | 0 | 0 |
| B1 | 91.20 | 40.20 | 54.40 | 63.30 | 0 | 53.90 |
| B2 | 0 | 0 | 0 | 0 | 34.40 | 0 |
| C1 | 0 | 0 | 0 | 0 | 0 | 0 |
| C2 | 0 | 0 | 0 | 0 | 0 | 0 |
| C3 | 0 | 0 | 0 | 0 | 0 | 0 |
| C4 | 0 | 0 | 0 | 0 | 0 | 0 |
| C5 | 0 | 0 | 0 | 0 | 0 | 5.77 |
| C6 | 0 | 0 | 0 | 0 | 0 | 0 |
| C7 | 0 | 0 | 0 | 0 | 0 | 0 |
| D1 | 10.00 | 10.00 | 10.00 | 10.00 | 10.00 | 10.00 |

TABLE 2-continued (unit: gram)

| | | | | | | |
|---|---|---|---|---|---|---|
| E1 | 3.00 | 3.00 | 3.00 | 3.00 | 3.00 | 3.00 |
| F1 | 0 | 350.00 | 350.00 | 350.00 | 350.00 | 350.00 |

| | Comparative Examples | | | | | |
|---|---|---|---|---|---|---|
| Components | 7 | 8 | 9 | 10 | 11 | 12 |
| A1 | 577.30 | 100.00 | 0 | 0 | 100.00 | 100.00 |
| A2 | 0 | 0 | 100.00 | 0 | 0 | 0 |
| A3 | 0 | 0 | 0 | 100.00 | 0 | 0 |
| B1 | 53.9 | 9.44 | 15.36 | 7.90 | 9.44 | 9.44 |
| B2 | 0 | 0 | 0 | 0 | 0 | 0 |
| C1 | 0 | 0 | 0 | 0 | 0 | 0 |
| C2 | 0 | 0 | 0 | 0 | 0 | 0 |
| C3 | 0 | 0 | 0 | 0 | 0 | 0 |
| C4 | 0 | 0 | 0 | 0 | 0 | 0 |
| C5 | 0 | 0 | 0 | 0 | 1.00 | 0 |
| C6 | 0 | 0 | 0 | 0 | 0 | 1.00 |
| C7 | 5.77 | 0 | 0 | 0 | 0 | 0 |
| D1 | 10.00 | 0 | 0 | 0 | 0 | 0 |
| E1 | 3.00 | 0 | 0 | 0 | 0 | 0 |
| F1 | 350.00 | 0 | 0 | 0 | 0 | 0 |

| | Comparative Examples | |
|---|---|---|
| Components | 13 | 14 |
| A1 | 100.00 | 100.00 |
| A2 | 0 | 0 |
| A3 | 0 | 0 |
| B1 | 9.44 | 0 |
| B2 | 0 | 4.77 |
| C1 | 0 | 0 |
| C2 | 0 | 0 |
| C3 | 0 | 0 |
| C4 | 0 | 0 |
| C5 | 0 | 0 |
| C6 | 0 | 0 |
| C7 | 1.00 | 0 |
| D1 | 0 | 0 |
| E1 | 0 | 0 |
| F1 | 0 | 0 |

The resin compositions for powder coating obtained in Examples 1 to 8 and Comparative Examples 1 to 7 were, respectively, coated on zinc phosphate-treated steel plates having a thickness of 0.6 mm in a film thickness of 60 μm by an electrostatic spray coating method and then baked at 180° C. for 20 minutes to obtain coating films by the above resin compositions for powder coating. The properties of these coating films were evaluated by the following test methods.

Test (1): Erichsen strength test

A metal plate having the coating film formed on its front surface was pushed from the rear side with a punch having a diameter of 20 mm to examine to what extent of pushed distance the coating film was durable. The Erichsen strength was represented by the pushed distance (mm) when rupture or peeling of the coating film occurred.

Test (2): Impact test (in accordance with JIS K-5400, test on impact resistance in the test method for coating materials in general)

Between an impactor having a predetermined roundness at its forward end and a bearer having a recess conforming to the roundness, a test piece is placed so that the coating layer faces upward, and the impactor having a predetermined roundness (weight containing a ball) was dropped on the surface of the coating film, whereby the impact resistance of the coating film was examined on the basis of whether rupture or peeling resulted. The impact strength was adjusted by the weight of the impactor and the dropping distance. The weight of the impactor and the dropping distance at the time when rupture or peeling resulted on the coating film surface, were recorded. The diameter of the forward end of the impactor was constantly ½ inch, and the impact resistance was represented by (weight of the impactor)×(height). The impact tester used was the one manufactured by Toyo Tester Kogyo K.K.

Test (3): Surface smoothness test

The obtained coating film surface was visually observed, and presence or absence of granules or irregularities was judged. Symbol ⊚ represents a case where no granules or irregularities were observed; symbol ○ represents a case where granules or irregularities were slightly observed; and symbol × represents a case where granules or irregularities were observed on the entire surface.

Test (4): Solvent resistance test (xylene rubbing)

The coating film surface was rubbed with a xylene-impregnated gauze for 20 reciprocations, whereby swelling or scraping of the coating film due to dissolution was inspected. Symbol ○ represents a case where no swelling or scraping of the coating film due to dissolution was observed; and symbol × represents a case where swelling or scraping of the coating film due to dissolution was observed even slightly.

The results of the above evaluation were shown in Table 3.

In Table 3, the coating film formed by the composition of Example 1 was represented by Example Film 1. Likewise, the coating films formed by the compositions of Examples 2 to 8 were represented by Example Films 2 to 8, and the coating films formed by the compositions of Comparative Examples 1 to 7 were represented by Comparative Example Films 1 to 7.

Test (5): Ratio of the ring opening polymerization

If (epoxy value before the heat curing of the resin composition for powder coating) is represented by (a1), (epoxy value after the heat curing of the resin composition for powder coating) by (a2) and (epoxy value consumed by the reaction) by (a3), (a1)–(a2)=(a3). Such (epoxy value consumed by the reaction) represents the amount of the entire epoxy groups required for curing of the resin composition for powder coating.

Further, if the entire carboxyl groups required for the curing of the resin composition for powder coating are represented by (b1) as the carboxyl value consumed by the reaction, (a3)–(b1) represents the amount of epoxy groups which did not react with carboxyl groups but participated in ring opening polymerization of the epoxy groups themselves to form a polyether. Namely, this (a3)–(b1) represents the amount for homo-polymerization.

The ratio of the ring opening polymerization is represented by [(a3)–(b1)]÷(a3)×100=(ring opening polymerization ratio) %. The higher this ring opening polymerization ratio, the more the homo-polymerization. Accordingly, symbol × represents a case where this ring opening polymerization ratio is at least 70%; symbol Δ represents a case where the ring opening polymerization ratio is at least 30% and less than 70%; and symbol ○ indicates a case where the ring opening polymerization ratio is less than 30%. The results are shown in Table 4. The quantitative analysis of epoxy groups, the quantitative analysis of carboxyl groups and the calculation of the epoxy value and the carboxyl value were conducted as follows.

(5-1) Quantitative analysis of epoxy groups

Tetraethylammonium bromide (first grade reagent), acetic acid (first grade reagent), acetic anhydride (first grade reagent), acetone (first grade reagent), crystal violet indica-

TABLE 3

| | Example Films | | | | | | | |
|---|---|---|---|---|---|---|---|---|
| Test Items | 1 | 2 | 3 | 4 | 5 | 6 | 7 | 8 |
| Erichsen strength | at least 10 mm | at least 10 mm | at least 10 mm | at least 10 mm | at least 10 mm | at least 10 mm | at least 10 mm | at least 10 mm |
| Impact resistance | at least 1 kg-50 cm | at least 1 kg-50 cm | at least 1 kg-50 cm | at least 1 kg-50 cm | at least 1 kg-50 cm | at least 1 kg-50 cm | at least 1 kg-50 cm | at least 1 kg-50 cm |
| Smoothness | ⊚ | ⊚ | ⊚ | ⊚ | ⊚ | ⊚ | ⊚ | ⊚ |
| Solvent resistance | ○ | ○ | ○ | ○ | ○ | ○ | ○ | ○ |

| | Comparative Example Films | | | | | | |
|---|---|---|---|---|---|---|---|
| Test Items | 1 | 2 | 3 | 4 | 5 | 6 | 7 |
| Erichsen strength | 5 mm | 5 mm | 5 mm | 5 mm | at least 10 mm | 7 mm | 7 mm |
| Impact resistance | 300 g-20 cm | 300 g-20 cm | 300 g-20 cm | 300 g-20 cm | at least 1 kg-50 cm | 300 g-30 cm | 300 g-30 cm |
| Smoothness | ⊚ | ⊚ | ⊚ | ⊚ | ○ | ⊚ | ⊚ |
| Solvent resistance | × | × | × | × | ○ | × | × |

20 g of each of the resin compositions for powder coating of Examples 9 to 14 and Comparative Examples 8 to 14, was placed on a Teflon plate and heated for curing for 20 minutes in a hot air circulating oven of 180° C. After cooling to room temperature, the test sample was freeze-pulverized until the particle size became about 100 μm. This sample was used for the following test (5): measurement of the ratio of the ring opening polymerization, and test (6): test on discoloration after heat curing.

tor (100 mg of crystal violet was dissolved in 100 ml of acetic acid), 0.1 N perchloric acid acetic acid normal solution (reagent: factor=1.000), tetraethylammonium bromide solution (70 g of tetraethylammonium bromide was dissolved in 500 ml of acetic acid and 500 ml of acetone) were prepared.

2 g of the above-mentioned test sample was accurately weighed and put in a 200 ml conical beaker, and 100 ml of the tetraethylammonium bromide solution was added thereto. Then, the test sample was swelled at room temperature over one hour and then titrated with the 0.1 N perchloric acid acetic normal solution. The end point was determined by a potentiometric automatic end point measuring apparatus (AT-200$_N$, tradename) manufactured by Kyoto Denshi Kogyo K.K.

The epoxy value (eq/kg) is represented by epoxy value= 0.1 V$_1$/h$_1$, where V$_1$ is the volume (ml) of the 0.1 N perchloric acid acetic acid normal solution required for the titration of the test sample, and h$_1$ is the weight (gram) of the weighed test sample.

(5-2) Quantitative analysis of carboxyl groups 1,4-Dioxane (first grade reagent) and 0.1 N sodium hydroxide aqueous solution (reagent: factor=1.000) were prepared.

2 g of the above-mentioned test sample was accurately weighed and put into a 200 ml conical beaker and swelled in 50 ml of 1,4-dioxane at room temperature over one hour. Then, 50 ml of distilled water was added thereto, followed by titration with the 0.1 N sodium hydroxide aqueous solution. The end point was determined by a potentiometric automatic end point measuring apparatus (AT-200$_N$, tradename) manufactured by Kyoto Denshi Kogyo K.K. The carboxyl value (eq/kg) is represented by carboxyl value=0.1 V$_2$/h$_2$l where V$_2$ is the volume (me) of the 0.1 N sodium hydroxide aqueous solution required for the titration of the test sample, and h$_2$ is the weight (gram) of the weighed test sample.

Test (6): Discoloration after heat curing

The above test sample was heated for 20 minutes in a hot air circulating oven at 180° C., whereupon discoloration (coloring) of the test sample was visually evaluated. Symbol ⊚ represents a case where no discoloration was observed; symbol ○ represents a case where discoloration was observed slightly; and symbol × represents a case where discoloration was observed substantially. The results are shown in Table 4.

TABLE 4

| | Examples | | | | | |
|---|---|---|---|---|---|---|
| Test Items | 9 | 10 | 11 | 12 | 13 | 14 |
| Ring opening polymerization ratio | ○ | ○ | ○ | ○ | ○ | ○ |
| Discoloration | ⊚ | ○ | ⊚ | ⊚ | ⊚ | ⊚ |

| | Comparative Examples | | | | | | |
|---|---|---|---|---|---|---|---|
| Test Items | 8 | 9 | 10 | 11 | 12 | 13 | 14 |
| Ring opening polymerization ratio | x | Δ | x | Δ | Δ | x | ○ |
| Discoloration | ⊚ | ⊚ | ⊚ | x | x | ⊚ | ○ |

The resin composition for powder coating of the present invention employs tris(β-methylglycidyl) isocyanurate as a curing agent, whereby smoothness of the obtained coating film surface is higher than the case where triglycidyl isocyanurate is employed. Besides, it contains component (C) which serves not only as an agent for inhibiting homo-polymerization of β-methylglycidyl groups themselves but also as an agent for accelerating the curing reaction between β-methylglycidyl groups and carboxyl groups, whereby β-methylglycidyl groups and carboxyl groups undergo a curing reaction adequately. Consequently, it showed superior results in the Erichsen strength test and the impact resistance test as compared with a case where component (C) was not used or a case where a component other than component (C) was used.

The resin composition for powder coating of the present invention employs tris(β-methylglycidyl) isocyanurate as a curing agent, whereby it is possible to melt-knead it uniformly with the carboxyl group containing resin at a relatively low temperature of from 70 to 120° C., preferably from 70 to 100° C. to prepare the resin composition. Accordingly, at such a temperature of melt-kneading, no reaction takes place between β-methylglycidyl groups and carboxyl groups, and when the resin composition is coated on a substrate, followed by heat curing, the flow property is good, and smoothness of the resulting coating film surface is high. Further, it contains no component which will be liberated during the heat curing, whereby it is free from a trouble of generation of a gas from the coating film and free from formation of e.g. bubbles in the coating film. Further, since it contains component (C), it is possible to prevent homo-polymerization of β-methylglycidyl groups themselves and promote the curing reaction between β-methylglycidyl groups and carboxyl groups, whereby the resulting coating film is less susceptible to rupture or peeling and is excellent in the impact resistance and the solvent resistance. Further, the glass transition temperature of the carboxyl group-containing resin of component (A) to be used in the present invention is from 30 to 120° C., while the melting of tris(β-methylglycidyl) isocyanurate is from 70 to 100° C. Accordingly, the resin composition for powder coating of the present invention has high storage stability without fusion (blocking) during the storage.

By utilizing such properties, the resin composition for powder coating of the present invention can be widely used for indoor and outdoor articles such as household electrical equipments and exterior walls.

What is claimed is:

1. A resin composition for powder coating, which comprises the following components (A), (B) and (C):

(A) a carboxyl group-containing resin having a number average molecular weight of from 1,000 to 20,000, an acid value of from 5 to 200 and a glass transition temperature of from 30 to 120° C.;

(B) tris(β-methylglycidyl) isocyanurate of the formula (1):

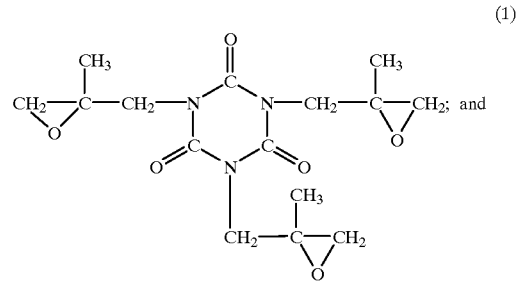

(C) as a ring opening polymerization inhibitor, at least one compound selected from the group consisting of an amine having in its molecule a bond of formula (2):

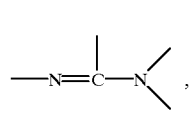

and an onium salt;

wherein the amine having in its molecule a bond of the formula (2) for component (C) is a cyclic amine having the structure of formula (3):

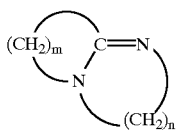
(3)

wherein m is an integer of from 2 to 11, and n is an integer of 2 or 3;

wherein the onium salt for component (C) is selected from the group consisting of:

a quaternary ammonium salt having the structure of formula (4):

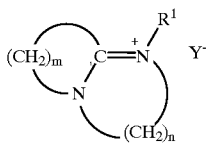
(4)

wherein m is an integer of from 2 to 11, n is an integer of 2 or 3, $R^1$ is an alkyl group or an aryl group, and $Y^-$ is an anion, a quaternary ammonium salt having the structure of formula (5):

$R^2R^3R^4R^5N^+Y^-$ wherein each of $R^2$, $R^3$, $R^4$ and $R^5$ is an alkyl group or an aryl group, N is a nitrogen atom, and $Y^-$ is an anion, provided that $R^2$, $R^3$, $R^4$ and $R^5$ are respectively bonded to the nitrogen atom by a C—N bond, a quaternary ammonium salt having the structure of formula (6):

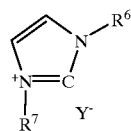
(6)

wherein each of $R^6$ and $R^7$ is an alkyl group or an aryl group, and $Y^-$ is an anion, a quaternary ammonium salt having the structure of formula (7):

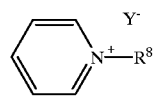
(7)

wherein $R^8$ is an alkyl group or an aryl group, and $Y^-$ is an anion, a quaternary ammonium salt having the structure of formula (8):

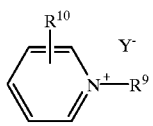
(8)

wherein each of $R^9$ and $R^{10}$ is an alkyl group or an aryl group, and $Y^-$ is an anion, a tertiary ammonium salt having the structure of formula (9):

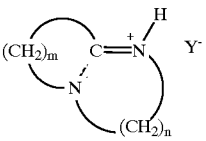
(9)

wherein m is an integer of from 2 to 11, n is an integer of 2 or 3, H is a hydrogen atom, and $Y^-$ is an anion, a quaternary phosphonium salt having the structure of the formula (10):

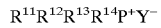
$R^{11}R^{12}R^{13}R^{14}P^+Y^-$ wherein each of $R^{11}$, $R^{12}$, $R^{13}$ and $R^{14}$ is an alkyl group or an aryl group, P is a phosphorous atom, and $Y^-$ is an anion, provided that R11, R12, R13 and R14 are respectively bonded to the phosphorus atom by a C—P bond, and a tertiary sulfonium salt having the structure of formula (11):

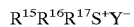
$R^{15}R^{16}R^{17}S^+Y^-$ wherein each of $R^{15}$, $R^{16}$ and $R^{17}$ is an alkyl group or an aryl group, and $Y^-$ is an anion, provided that $R^{15}$, $R^{16}$ and $R^{17}$ are respectively bonded to the sulfur atom by a C—S bond;

wherein said components (A) and (B) are present in such a ratio that the equivalent ratio of (β-methylglycidyl groups in component B)/(carboxyl groups in component (A) is within a range of from 1.1 to 2.5 and wherein said component (C) is present in an amount of from 0.01 to 10 parts by weight, per 100 parts by weight of component (A).

2. The resin composition for powder coating according to claim 1, wherein component (C) is at least one onium salt selected from the group consisting of compounds of the formulas (4), (6), (7), (8), (9), (10) and (11).

3. The resin composition for powder coating according to claim 1, wherein the carboxyl group-containing resin for component (A) is a polyester resin, a polyacrylic resin or a mixture thereof.

4. The resin composition for powder coating according to claim 1, wherein the carboxyl group-containing resin for component (A) is a polyester resin having carboxyl groups derived from an aliphatic carboxylic acid.

5. The resin composition for powder coating according to claim 1, wherein the carboxyl group-containing resin for component (A) is a polyester resin having carboxyl groups derived from an aromatic carboxylic acid having a pKa value of at most 4.0.

* * * * *